United States Patent [19]

Nitz

[11] Patent Number: 4,805,750
[45] Date of Patent: Feb. 21, 1989

[54] STEADY STATE SLIP DETECTION/CORRECTION FOR A MOTOR VEHICLE TRANSMISSION

[75] Inventor: Larry T. Nitz, Troy, Mich.

[73] Assignee: Saturn Corporation, Troy, Mich.

[21] Appl. No.: 101,833

[22] Filed: Sep. 28, 1987

[51] Int. Cl.$^4$ ............................................. B60K 41/22
[52] U.S. Cl. ................................. 192/3.58; 192/103 F
[58] Field of Search ........................... 192/3.58, 103 F; 74/336 R, 752 A

[56] References Cited

U.S. PATENT DOCUMENTS

| | | | |
|---|---|---|---|
| 3,690,197 | 9/1972 | Sumiyoshi et al. | 74/752 A X |
| 4,444,297 | 4/1984 | Parsons | 192/3.58 |
| 4,485,443 | 11/1984 | Knodler et al. | 74/752 A X |
| 4,503,734 | 3/1985 | Acker | 192/3.58 X |
| 4,529,072 | 7/1985 | Oguma et al. | 192/3.58 X |

Primary Examiner—Rodney H. Bonck
Attorney, Agent, or Firm—Mark A. Navarre

[57] ABSTRACT

A closed loop clutch pressure control effective during steady state (nonshifting) operation of a motor vehicle transmission for adjusting the scheduled clutch pressure to generate torque capacity substantially in the amount required to transmit the transmission input torque. When significant slippage is detected, the pressure is adjusted upward to increase the torque capacity of the clutch. If significant slippage is not detected over a period of specified driving cycles, the pressure is adjusted downward to decrease the torque capacity of the clutch. This results in a low frequency clutch pressure limit cycle which enhances the efficiency of the transmission control while maintaining the clutch slippage within acceptable limits.

5 Claims, 7 Drawing Sheets

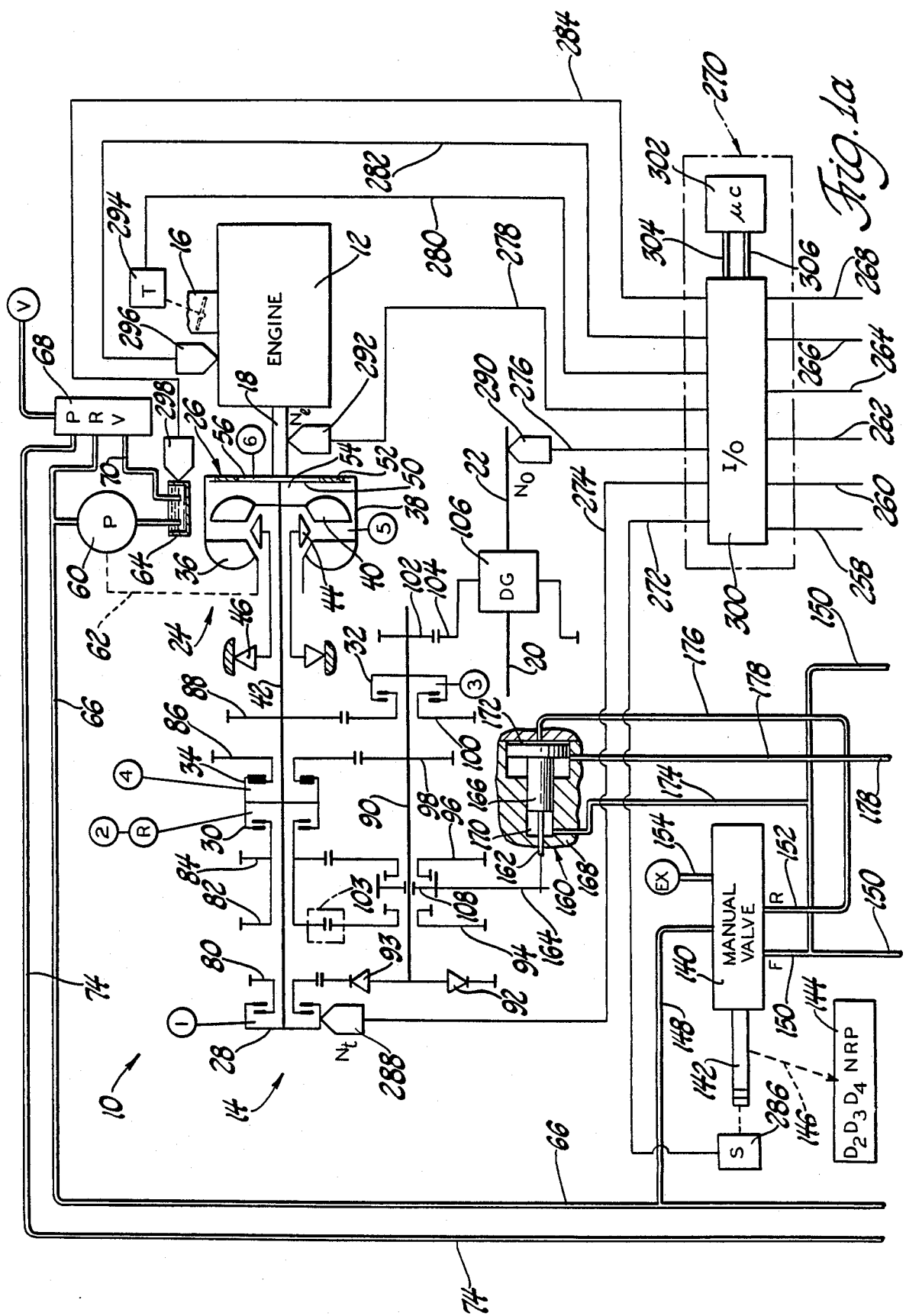

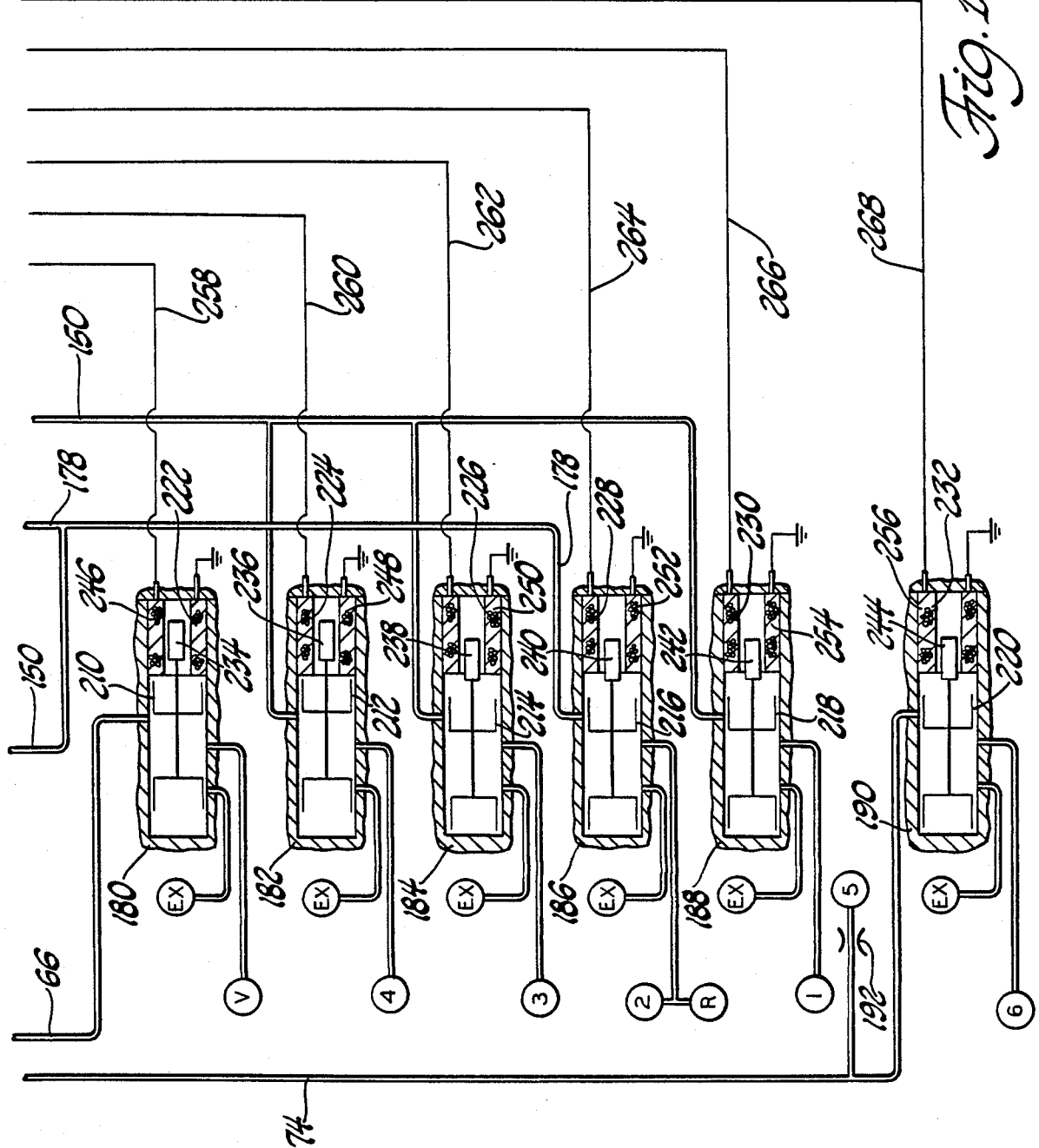

STEADY STATE SLIP DETECTION/CORRECTION FOR A MOTOR VEHICLE TRANSMISSION

This invention relates to pressure control in an electronically controlled motor vehicle transmission, and more particularly, to a control for detecting and correcting clutch slippage during nonshifting or steady state operation of the transmission.

BACKGROUND OF THE INVENTION

Motor vehicle transmissions are generally equipped with fluid operated torque transmitting devices (referred to as clutches or brakes) which are engageable according to a predefined schedule to establish various speed ratio drives between the input and output shafts of the transmission. With electronic controls, the engagement pressure of the active clutch or brake may likewise be scheduled so as to develop torque capacity in relation to the transmission input torque. If the torque capacity of the clutch is less than the input torque, the clutch slips resulting in excessive heat generation and wear; if the torque capacity of the clutch is significantly greater than the input torque, the energy required to generate the excess torque capacity is wasted.

SUMMARY OF THE PRESENT INVENTION

The present invention is directed to a transmission closed-loop clutch pressure control effective during steady state (nonshifting) operation of the transmission for adjusting the scheduled clutch pressure to generate torque capacity substantially in the amount required to transmit the transmission input torque. When significant slippage is detected, the pressure is adjusted upward to increase the torque capacity of the clutch. If significant slippage is not detected over a period of specified driving cycles, the pressure is adjusted downward to decrease the torque capacity of the clutch. This results in a low frequency clutch pressure limit cycle which enhances the efficiency of the transmission control while maintaining the clutch slippage within acceptable limits.

The presence of significant clutch slippage is detected by a novel routine which generates a cumulative indication of the slippage between input and output shafts of the transmission. When the cumulative slippage indication exceeds a reference slip value, it is reset. The time required for the cumulative slippage indication to exceed the reference slip value is measured and compared to a reference time indicative of excessive slippage. If the measured time is less than or equal to the reference time, there is excessive slippage and the pressure supplied to the active clutch or brake is increased in relation to the measured time, thereby to increase its torque capacity and reduce the slippage to an acceptable level.

If excessive slippage continues after the pressure has been increased to its maximum value using the above described routine, a clutch or gear failure is indicated. In this event, a routine is provided for adjusting the transmission shift points to reflect the loss of that gear.

If the time required for the cumulative slippage indication to exceed the reference value is greater than the reference time, the slippage is within acceptable limits and the routine for reducing the clutch pressure is activated. Before a pressure reduction is effected, the transmission input torque must undergo a specified number of consecutive torque sweeps defined in relation to a pair of predefined positive torque thresholds. If the specified number of sweeps occur without the detection of excessive slippage, there is a probability that the clutch pressure is greater than that required to transmit the transmission input torque and the controller reduces the clutch pressure by a predetermined correction amount.

BRIEF DESCRIPTION OF THE DRAWINGS

FIGS. 1a and 1b schematically depict a computer based electronic transmission control system according to the teachings of this invention.

FIG. 2 depicts the various parameters involved in the routine, and FIG. 3 depicts the pressure correction as a function of the time required for the cumulative slip indication to exceed a reference slip value.

FIG. 5 depicts a main loop program; FIGS. 6-8 depict routines for steady state clutch pressure detection/correction and shift point adjustment.

DETAILED DESCRIPTION OF THE DRAWINGS

Figure 2:
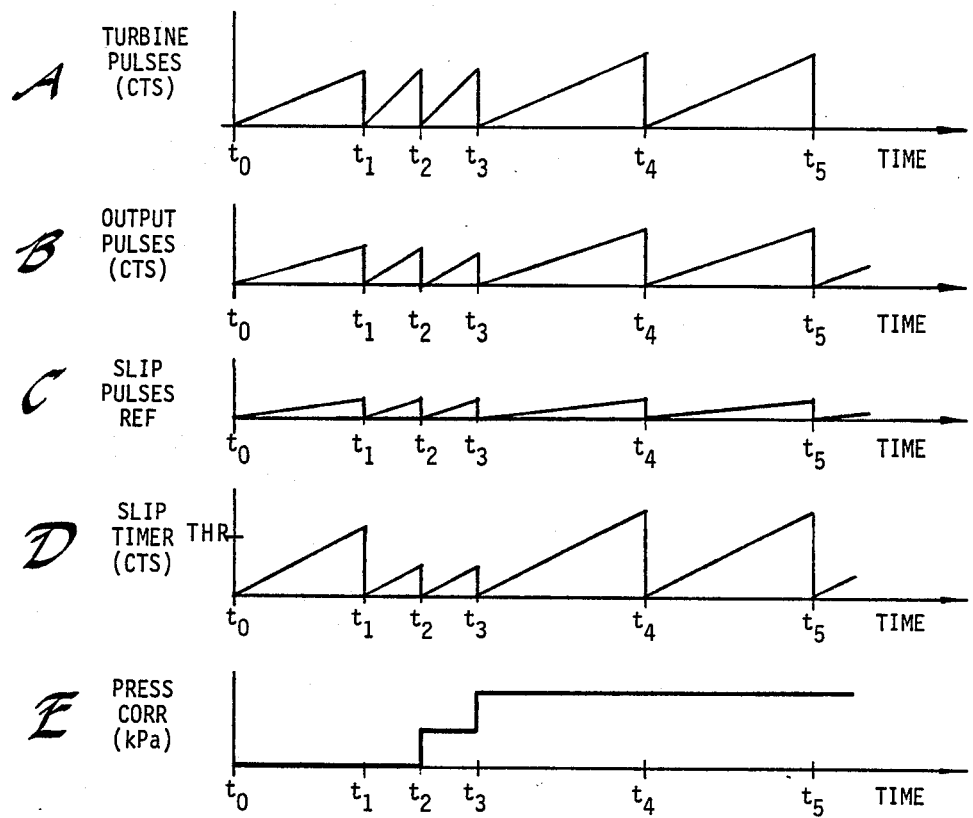
FIGS. 2 and 3 graphically depict the operation of this invention for effecting an increase in the pressure supplied to the active clutch.

Referring now to FIGS. 1a and 1b, the reference numeral 10 generally designates a motor vehicle drive train including an engine 12 and a parallel shaft transmission 14 having a reverse speed ratio and four forward speed ratios. Engine 12 includes a throttle mechanism 16 mechanically connected to an operator manipulated device such as an accelerator pedal (not shown) for regulating engine output torque, such torque being applied to the transmission 14 through the engine output shaft 18. The transmission 14 transmits engine output torque to a pair of drive axles 20 and 22 through a torque converter 24 and one or more of the fluid operated clutching devices 26-34, such clutching devices being applied or released according to a predetermined schedule for establishing the desired transmission speed ratio.

Referring now more particularly to the transmission 14, the impeller or input member 36 of the torque converter 24 is connected to be rotatably driven by the output shaft 18 of engine 12 through the input shell 38. The turbine or output member 40 of the torque converter 24 is rotatably driven by the impeller 36 by means of fluid transfer therebetween and is connected to rotatably drive the shaft 42. A stator member 44 redirects the fluid which couples the impeller 36 to the turbine 40, the stator being connected through a one-way device 46 to the housing of transmission 14. The torque converter 24 also includes a clutching device 26 comprising a clutch plate 50 secured to the shaft 42. The clutch plate 50 has a friction surface 52 formed thereon adaptable to be engaged with the inner surface of the input shell 38 to form a direct mechanical drive between the engine output shaft 18 and the transmission shaft 42. The clutch plate 50 divides the space between input shell 38 and the turbine 40 into two fluid chambers: an apply chamber 54 and a release chamber 56.

When the fluid pressure in the apply chamber 54 exceeds that in the release chamber 56, the friction surface 52 of clutch plate 50 is moved into engagement with the input shell 38 as shown in FIG. 1, thereby engaging the clutching device 26 to provide a mechanical drive connection in parallel with the torque converter 24. In such case, there is no slippage between the impeller 36 and the turbine 40.

When the fluid pressure in the release chamber 56 exceeds that in the apply chamber 54, the friction surface 52 of the clutch plate 50 is moved out of engagement with the input shell 38 thereby uncoupling such mechanical drive connection and permitting slippage between the impeller 36 and the turbine 40. The circled numeral 5 represents a fluid connection to the apply chamber 54 and the circled numeral 6 represents a fluid connection to the release chamber 56.

A positive displacement hydraulic pump 60 is mechanically driven by the engine output shaft 18 through the input shell 38 and impeller 36 as indicated by the broken line 62. Pump 60 receives hydraulic fluid at low pressure from the fluid reservoir 64 and supplies pressurized fluid to the transmission control elements via output line 66. A pressure regulator valve (PRV) 68 is connected to the pump output line 66 and serves to regulate the fluid pressure (hereinafter referred to as line pressure) in line 66 by returning a controlled portion of the fluid therein to reservoir 64 via the line 70. In addition, pressure regulator valve 68 supplies fluid pressure for the torque converter 24 via line 74. While the pump and pressure regulator valve designs are not critical to the present invention, a representative pump is disclosed in the U.S. Pat. No. 4,342,545, to Schuster issued Aug. 3, 1982, and a representative pressure regulator valve is disclosed in the U.S. Pat. No. 4,283,970, to Vukovich issued Aug. 18, 1981, such patents being assigned to the assignee of the present invention.

The transmission shaft 42 and a further transmission shaft 90 each have a plurality of gear elements rotatably supported thereon. The gear elements 80–88 are supported on shaft 42 and the gear elements 92–102 are supported on shaft 90. The gear element 88 is rigidly connected to the shaft 42 and the gear elements 98 and 102 are rigidly connected to the shaft 90. Gear element 92 is connected to the shaft 90 via a freewheeler or one-way device 93. The gear elements 80, 84, 86 and 88 are maintained in meshing engagement with the gear elements 92, 96, 98 and 100, respectively, and the gear element 82 is coupled to the gear element 94 through a reverse idler gear 103. The shaft 90, in turn, is coupled to the drive axles 20 and 22 through gear elements 102 and 104 and a conventional differential gear set (DG) 106.

A dog clutch 108 is splined on the shaft 90 so as to be axially slidable thereon and serves to rigidly connect the shaft 90 either to the gear element 96 (as shown) or the gear element 94. A forward speed relation between the gear element 84 and shaft 90 is established when dog clutch 108 connects the shaft 90 to gear element 96, and a reverse speed relation between the gear element 82 and shaft 90 is established when the dog clutch 108 connects the shaft 90 to the gear element 94.

The clutching devices 28–34 each comprise an input member rigidly connected to a transmission shaft 42 or 90 and an output member rigidly connected to one or more gear elements such that engagement of a clutching device couples the respective gear element and shaft to effect a driving connection between the shafts 42 and 90. The clutching device 28 couples the shaft 42 to the gear element 80; the clutching device 30 couples the shaft 42 to the gear elements 82 and 84; the clutching device 32 couples the shaft 90 to the gear element 100; and the clutching device 34 couples the shaft 42 to the gear element 86. Each of the clutching devices 28–34 is biased toward a disengaged state by a return spring (not shown). Engagement of the clutching device is effected by supplying fluid pressure to an apply chamber thereof. The resulting torque capacity of the clutching device is a function of the applied pressure less the return spring pressure. The circled numeral 1 represents a fluid passage for supplying pressurized fluid to the apply chamber of clutching device 28; the circled numeral 2 and letter R represent a fluid passage for supplying pressurized fluid to the apply chamber of the clutching device 30; the circled numeral 3 represents a fluid passage for supplying pressurized fluid to the apply chamber of the clutching device 32; and the circled numeral 4 represents a fluid passage for directing pressurized fluid to the apply chamber of the clutching device 34.

The various gear elements 80–88 and 92–100 are relatively sized such that engagement of first, second, third and fourth forward speed ratios are effected by engaging the clutching devices 28, 30, 32 and 34, respectively, it being understood that the dog clutch 108 must be in the position depicted in FIG. 1 to obtain a forward speed ratio. A neutral speed ratio or an effective disconnection of the drive axles 20 and 22 from the engine output shaft 18 is effected by maintaining all of the clutching devices 28–34 in a released condition. The speed ratios defined by the various gear element pairs are generally characterized by the ratio of the turbine speed $N_t$ to output speed $N_o$. Representative $N_t/N_o$ ratios for transmission 14 are as follows:

FIRST—2.368
SECOND—1.273
THIRD—0.808
FOURTH—0.585
REVERSE—1.880

Shifting from a current forward speed ratio to a desired forward speed ratio requires that the clutching device associated with the current speed ratio (off-going) be disengaged and the clutching device associated with the desired speed ratio (on-coming) be engaged. For example, a shift from the first forward speed ratio to the second forward speed ratio involves disengagement of the clutching device 28 and engagement of the clutching device 30.

The fluid control elements of the transmission 14 include a manual valve 140, a directional servo 160 and a plurality of electrically operated fluid valves 180–190. The manual valve 140 operates in response to operator demand and serves, in conjunction with directional servo 160, to direct regulated line pressure to the appropriate fluid valves 182–188. The fluid valves 182–188, in turn, are individually controlled to direct fluid pressure to the clutching devices 28–34. The fluid valve 180 is controlled to direct fluid pressure from the pump output line 66 to the pressure regulator valve 68 and the fluid valve 190 is controlled to direct fluid pressure from the line 74 to the clutching device 26 of torque converter 24. The directional servo 160 operates in response to the condition of the manual valve 140 and serves to properly position the dog clutch 108.

The manual valve 140 includes a shaft 142 for receiving axial mechanical input from the operator of the motor vehicle in relation to the speed range the operator desires. The shaft 142 is also connected to an indicator mechanism 144 through a suitable mechanical linkage as indicated generally by the broken line 146. Fluid pressure from the pump output line 66 is applied as an input to the manual valve 140 via the line 148 and the valve outputs include a forward (F) output line 150 for supplying fluid pressure for engaging forward speed ratios and a reverse (R) output line 152 for supplying fluid pressure for engaging the reverse speed ratio. Thus, when the shaft 142 of manual valve 140 is moved to the D4, D3 or D2 positions shown on the indicator mechanism 144, line pressure from the line 148 is directed to the forward (F) output line 150. When the shaft 142 is in the R position shown on the indicator mechanism 144, line pressure from the line 148 is directed to the reverse (R) output line 152. When the shaft 142 of manual valve 140 is in the N (Neutral) or P (Park) positions, the input line 148 is isolated and the forward and reverse output lines 150 and 152 are connected to an exhaust line 154 which is adapted to return any fluid therein to the fluid reservoir 64.

The directional servo 160 is a fluid operated device and includes an output shaft 162 connected to a shift fork 164 for axially shifting the dog clutch 108 on shaft 90 to selectively enable either forward or reverse speed ratios. The output shaft 162 is connected to a piston 166 axially movable within the servo housing 168. The axial position of the piston 166 within the housing 168 is determined according to the fluid pressures supplied to the chambers 170 and 172. The forward output line 150 of manual valve 140 is connected via line 174 to the chamber 170 and the reverse output line 152 of manual valve 140 is connected via the line 176 to the chamber 172.

When the shaft 142 of the manual valve 140 is in a forward range position, the fluid pressure in the chamber 170 urges piston 166 rightward as viewed in FIG. 1 to engage the dog clutch 108 with the gear element 96 for enabling engagement of a forward speed ratio. When the shaft 142 of the manual valve 140 is moved to the R position, the fluid pressure in chamber 172 urges piston 166 leftward as viewed in FIG. 1 to engage the dog clutch 108 with the gear element 94 for enabling engagement of the reverse speed ratio. In each case, it will be remembered that the actual engagement of the second or reverse speed ratio is not effected until engagement of the clutching device 30.

The directional servo 160 also operates as a fluid valve for enabling the reverse speed ratio. To this end, the directional servo 160 includes an output line 178 connected to the electrically operated fluid valve 186. When the operator selects a forward speed ratio and the piston 166 of directional servo 160 is in the position depicted in FIG. 1, the passage between lines 176 and 178 is cut off; when the operator selects the reverse gear ratio, the passage between the lines 176 and 178 is open.

The electrically operated fluid valves 180–190 each receive fluid pressure at an input passage thereof from the pump 60 and are individually controlled to direct fluid pressure to the pressure regulator valve 68 or respective clutching devices 26–34. The fluid valve 180 receives line pressure directly from pump output line 66 and is controlled to direct a variable amount of such pressure to the pressure regulator valve 68 as indicated by the circled letter V.

The fluid valves 182, 186 and 188 receive fluid pressure from the forward output line 150 of manual valve 140 and are controlled to direct variable amounts of such pressure to the clutching devices 34, 32 and 28 as indicated by the circled numerals 4, 3 and 1, respectively. The fluid valve 186 receives fluid pressure from the forward output line 150 and the directional servo output line 178 and is controlled to direct a variable amount of such pressure to the clutching device 30, as indicated by the circled numeral 2 and the circled letter R. The fluid valve 190 receives fluid pressure from line 74 of pressure regulator valve 68 and is controlled to direct a variable amount of such pressure to the release chamber 56 of the clutching device 26, as indicated by the circled numeral 6. The apply chamber 54 of the clutching device 26 is supplied with fluid pressure from the output line 74 via the orifice 192 as indicated by the circled numeral 5.

Each of the fluid valves 180–190 includes a spool element 210–220 axially movable within the respective valve body for directing fluid flow between input and output passages. When a respective spool element 210–220 is in the rightmost position, as viewed in FIG. 1, the input and output passages are connected. Each of the fluid valves 180–190 includes an exhaust passage as indicated by the circled letters EX, such passage serving to drain fluid from the respective clutching device when the spool element is shifted to the leftmost position as viewed in FIG. 1b. In FIG. 1b, the spool elements 210 and 212 of fluid valves 180 and 182 are shown in the rightmost position connecting the respective input and output lines, while the spool elements 214, 216, 218 and 220 of the fluid valves 184, 186, 188 and 190 are shown in the leftmost position connecting the respective output and exhaust lines. Each of the fluid valves 180–190 includes a solenoid 222–232 for controlling the position of its spool element 210–220.

Each such solenoid 222–232 comprises a plunger 234–244 connected to the respective spool element 210–220 and a solenoid coil 246–256 surrounding the respective plunger. One terminal of each such solenoid coil 246–256 is connected to ground potential, as shown, and the other terminal is connected to an output line 258–268 of a control unit 270 which governs the solenoid coil energization. As set forth hereinafter, the control unit 270 pulse-width-modulates the solenoid coils 246–256 according to a predetermined control algorithm to regulate the fluid pressure supplied to the pressure regulator 68 and the clutching devices 26–34, the duty cycle of such modulation being determined in relation to the desired magnitude of the supplied pressures.

While the fluid valves 180–190 have been illustrated as spool valves, other types of valves could be substituted therefor. By way of example, valves of the ball and seat type could be used. In general terms, the fluid valves 180–190 may be mechanized with any three-port pulse-width-modulated valving arrangement.

Input signals for the control unit 270 are provided on the input lines 272–284. A position sensor (S) 286 responsive to movement of the manual valve shaft 142 provides an input signal to the control unit 270 via line 272. Speed transducers 288, 290 and 292 sense the rotational velocity of various rotary members within the transmission 14 and supply speed signals in accordance therewith to the control unit 270 via lines 274, 276 and 278, respectively. The speed transducer 288 senses the velocity of the transmission shaft 42 and therefore the turbine or transmission input speed $N_t$; the speed transducer 290 senses the velocity of the drive axle 22 and therefore the transmission output speed $N_o$; and the speed transducer 292 senses the velocity of the engine output shaft 18 and therefore the engine speed $N_e$. The position transducer 294 is responsive to the position of the engine throttle 16 and provides an electrical signal in accordance therewith to control unit 270 via line 280.

A pressure transducer 296 senses the manifold absolute pressure (MAP) of the engine 12 and provides an electrical signal to the control unit 270 in accordance therewith via line 282. A temperature sensor 298 senses the temperature of the oil in the transmission fluid reservoir 64 and provides an electrical signal in accordance therewith to control unit 270 via line 284.

The control unit 270 responds to the input signals on input lines 272-284 according to a predetermined control algorithm as set forth herein, for controlling the energization of the fluid valve solenoid coils 246-256 via output lines 258-268. As such, the control unit 270 includes an input/output (I/O) device 300 for receiving the input signals and outputting the various pulse-width-modulation signals, and a microcomputer 302 which communicates with the I/O device 300 via an address-and-control bus 304 and a bidirectional data bus 306. Flow diagrams representing suitable program instructions for developing the pulse-width-modulation outputs in accordance with the teachings of this invention are depicted in FIGS. 5-8.

Figure 3:
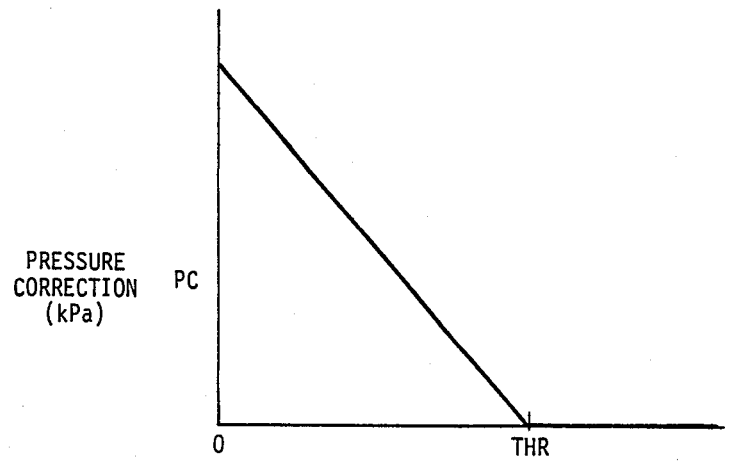

Clutch pressure increases effected according to this invention are graphically depicted in FIGS. 2 and 3. FIG. 2 depicts several parameters pertaining to such increases, all on a common time base. Particularly, Graph A depicts the cumulative output pulses of turbine speed sensor 288; Graph B depicts the cumulative output pulses of output speed sensor 290; Graph C depicts the cumulative slip pulse indication generated according to this invention; Graph D depicts the value of a SLIP TIMER according to this invention; and Graph E depicts the corresponding clutch pressure correction according to this invention. The cumulative input pulse indication depicted in Graph A may be derived from an input counter internal to control unit 270.

The Graphs A-E of FIG. 2 begin at time $t_0$ when the various input counters and registers are reset to zero. Thereafter, control unit 270 predicts a cumulative turbine speed pulse indication, based on a cumulative output speed pulse indication and the transmission speed ratio. The cumulative slip pulse indication of Graph C is determined according to the difference between predicted and actual cumulative turbine speed pulse indications. At the same time, a timer (SLIP TIMER) internal to control unit 270 generates an indication of the elapsed time, as depicted in Graph D. When the cumulative slip pulse indication of Graph C exceeds the reference REF, the SLIP TIMER and the input counters for the turbine and output speed are reset to zero. In FIG. 2, this occurs at times $t_1$, $t_2$, $t_3$, $t_4$ and $t_5$.

According to this invention, the count in the SLIP TIMER at the time of its reset provides an indication of the slippage between the turbine and output shafts 42 and 22. If the timer value is relatively high, the amount of slippage is acceptable; if the timer value is relatively low, the slippage is excessive. For control purposes, control unit 270 defines a threshold timer value THR corresponding to marginally excessive clutch slippage. If the value of the SLIP TIMER is greater than the threshold THR, the level of slippage is acceptable and no pressure correction is made. This condition occurs at times $t_1$, $t_4$ and $t_5$, as indicated in Graph E. If the value of the SLIP TIMER is less than the threshold THR, the level of slippage is excessive and the pressure supplied to the active clutch is increased in relation to the SLIP TIMER value. This condition occurs at times $t_2$ and $t_3$, as indicated in Graph E. The magnitude of the correction is graphically depicted in FIG. 3 as a function of the SLIP TIMER value.

In the manner described above, the pressure supplied to the active clutch of transmission 14 is increased as required to reduce the slippage indication to within an acceptable limit, defined by the threshold THR. However, the pressure cannot be increased beyond the maximum line pressure of the transmission. If the correction causes the clutch pressure to be increased to the maximum line pressure and excessive slippage is still detected, it is assumed that a failure of the clutch or gear has occurred. In such event, the transmission in shifted to a different speed ratio and the shift point table is adjusted to reflect the unavailability of that ratio.

While a condition of positive slip—that is, $N_t$ greater than $N_o$—is indicated in the example of FIG. 2, it will be recognized that slip may occur in the opposite sense during vehicle deceleration. In either event, the slippage is undesirable if excessive, since it generates excessive heating and wear of the clutch elements. Thus, the control of this invention responds in the same manner to both positive and negative excessive clutch slippage.

Figure 4:
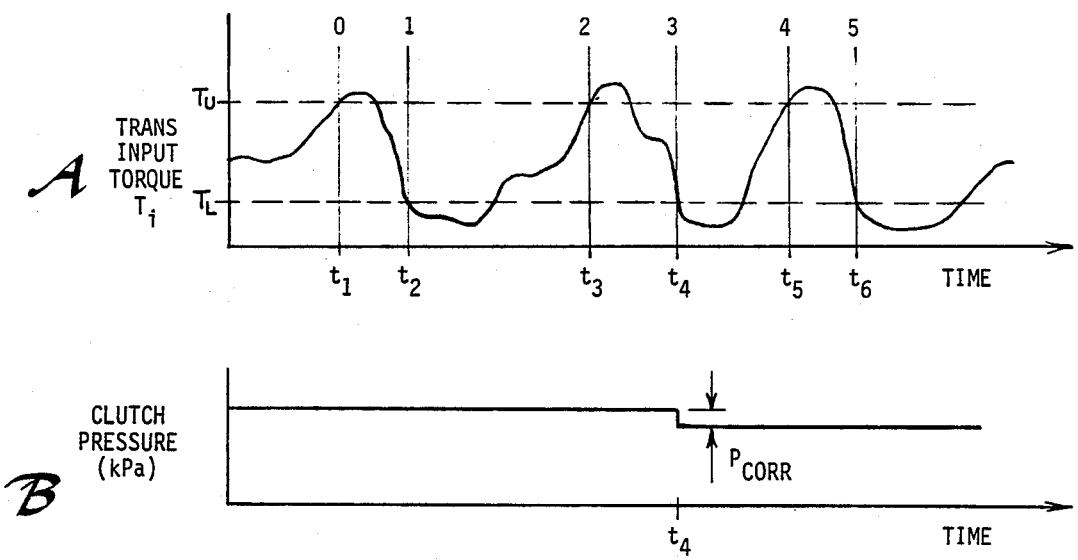
FIG. 4 graphically depicts various parameters involved in effecting a decrease in the pressure supplied to the active clutch.

A clutch pressure decrease effected according to this invention is depicted in Graphs A and B of FIG. 4, which graphs share a common time base. Particularly, Graph A depicts an estimation of the transmission input torque $T_i$; and Graph B depicts the pressure supplied to the active clutch of transmission 14. It is assumed for the purpose of FIG. 4 that no excessive clutch slippage is detected—that is, the SLIP TIMER values are consistently above the threshold THR.

The value of the transmission input torque $T_i$ may be calculated as a function of the engine manifold absolute pressure (MAP), the engine pumping efficiency (K), a mechanical friction term ($T_f$), the accessory load torque ($T_L$), and the torque multiplication ratio ($T_c$) of the torque converter 24 according to the following expression:

$$T_i = [(MAP \times K) - T_f - T_i] \times T_c$$

The engine MAP is determined from the sensor 296, while the efficiency K is stored based on previously determined data. The mechanical friction term $T_f$ is determined as a function of engine speed, and the load torque term $T_i$ is determined by loading indicators. The torque multiplication ratio $T_c$ is determined as a function of the speed ratio $N_t/N_e$.

Over a period of normal driving, the input torque tends to be cyclical in nature, as indicated in Graph A. According to this invention, the pressure supplied to the active clutch is only reduced after the transmission input torque $T_i$ has undergone a predetermined number of cycles or sweeps without the detection of excessive slippage. The cycles are defined in relation to upper and lower threshold torque values $T_U$ and $T_L$, as indicated on the vertical axis of Graph A. After three cycles or sweeps through the torque window defined by $T_U$ and $T_L$, the clutch pressure is reduced by a predetermined amount $P_{CORR}$ as indicated in Graph B at time $t_4$.

Pressure reductions are permitted to continue, as described above in reference to FIG. 4, until excessive slippage is detected. At such point, the pressure will be increased in relation to the SLIP TIMER value as described above in reference to FIGS. 2-3. This results in a pressure or clutch slippage limit cycle of very low frequency and serves to maintain sufficient clutch pressure to substantially match the transmission input torque. This prevents excessive heating and wear of the transmission elements due to clutch slippage, and at the same time, enhances the operating efficiency of the transmission by minimizing excess clutch torque capacity.

Figure 5:
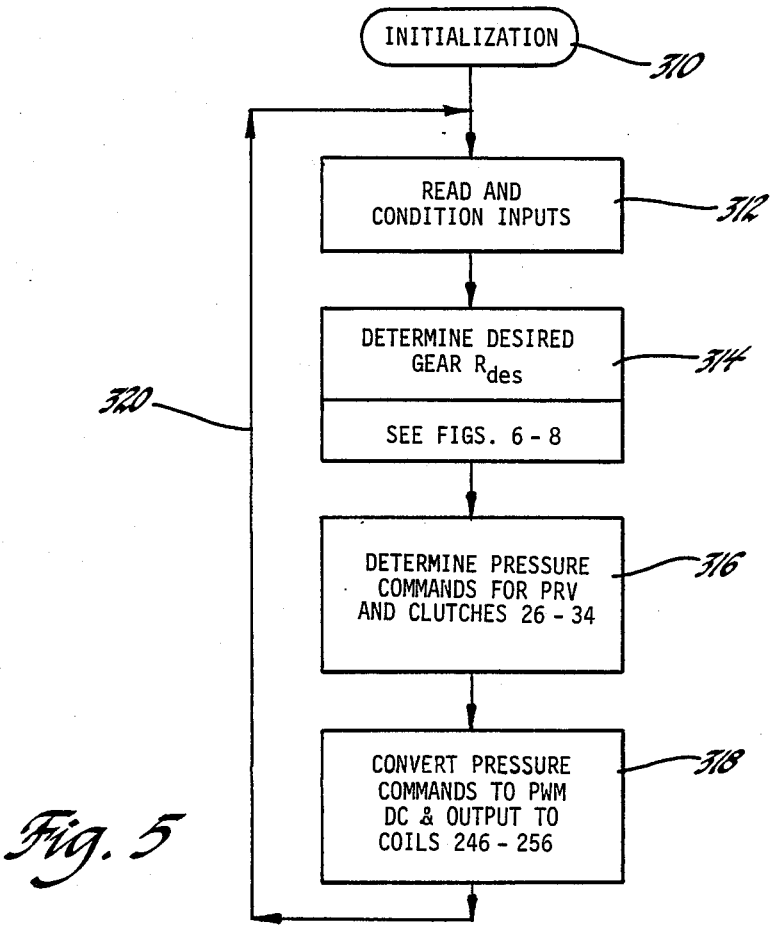
FIGS. 5-8 depict flow diagrams representative of suitable program instructions executed by the computer based controller of FIG. 1 for carrying out the control functions of this invention.
Figure 6:
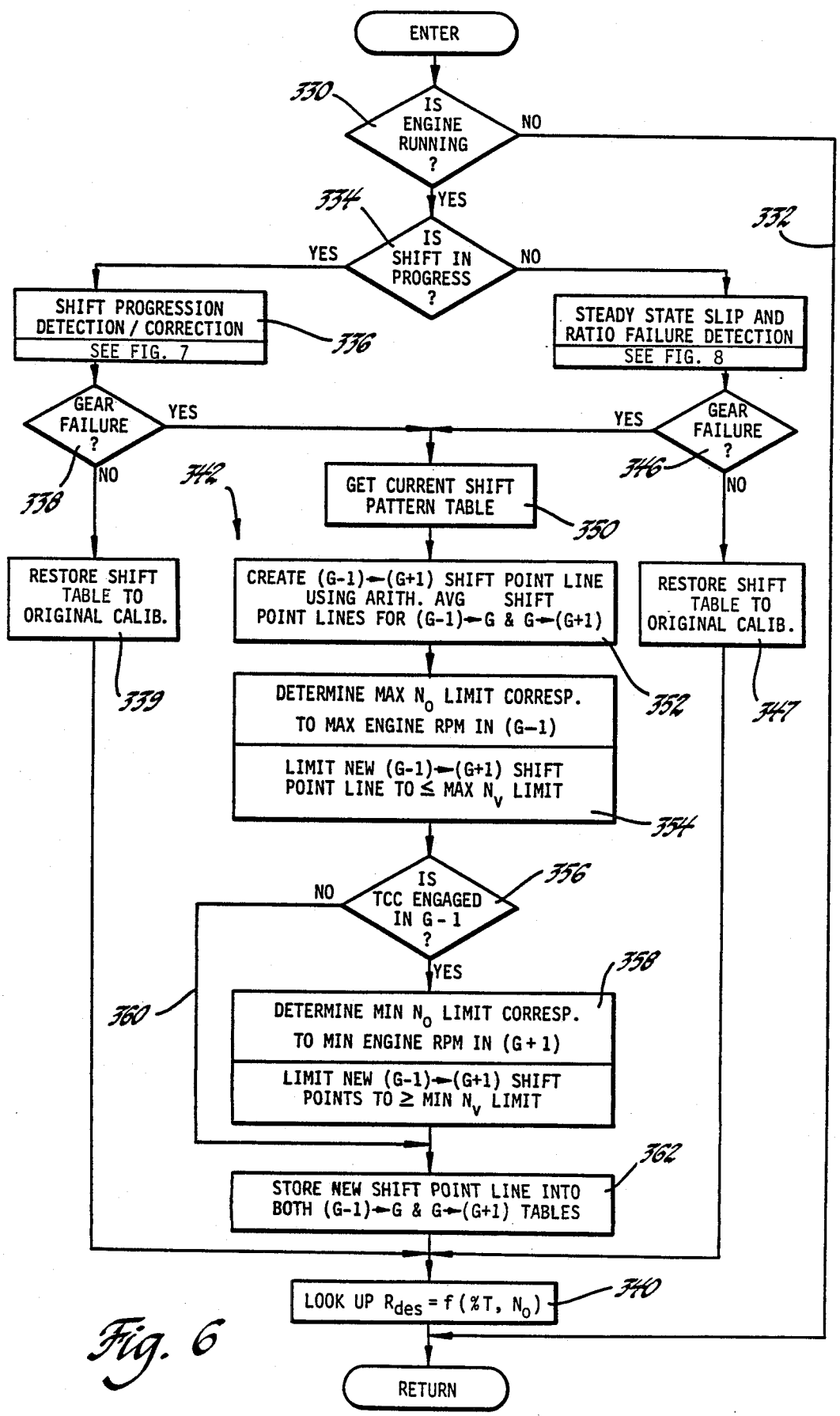
Figure 7:
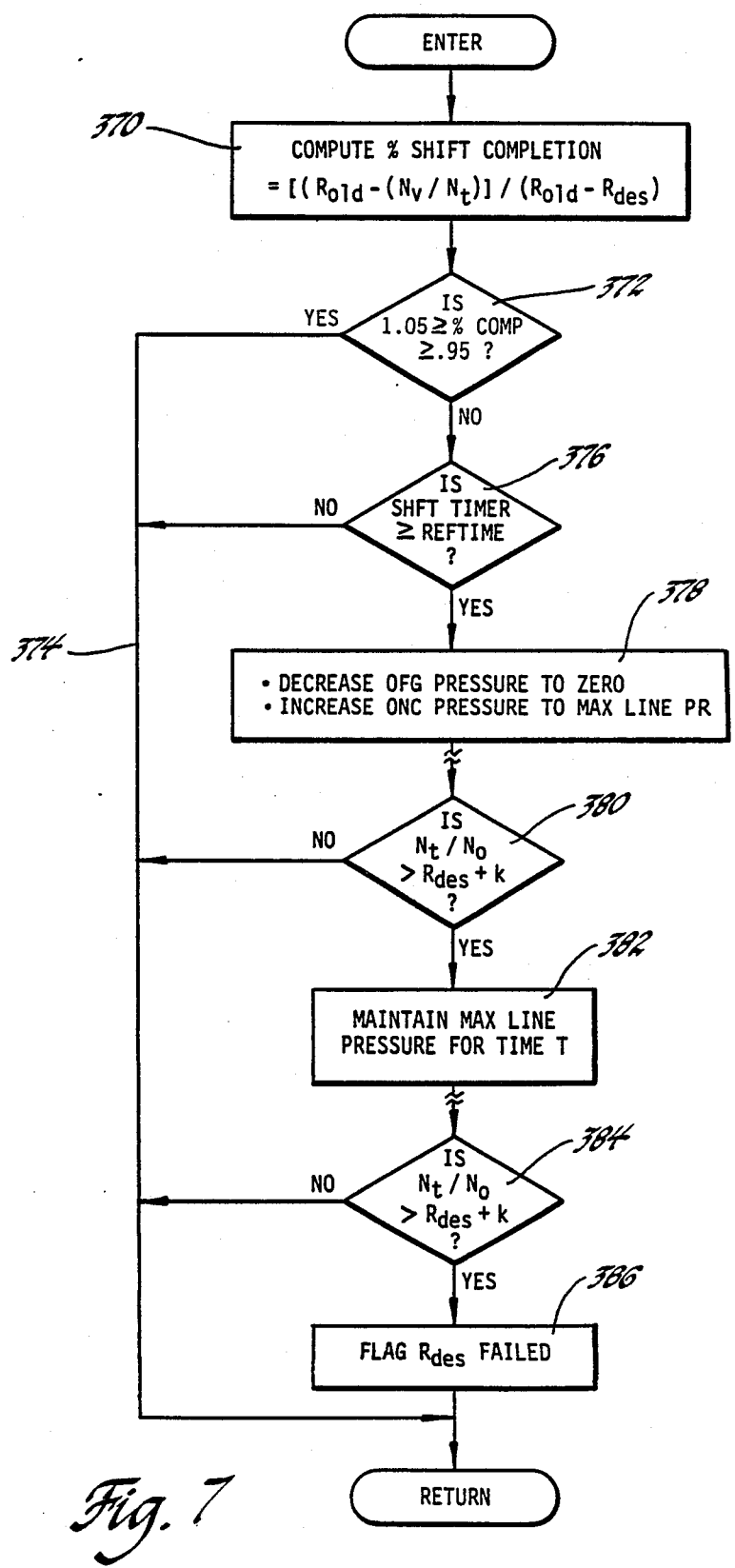
Figure 8:
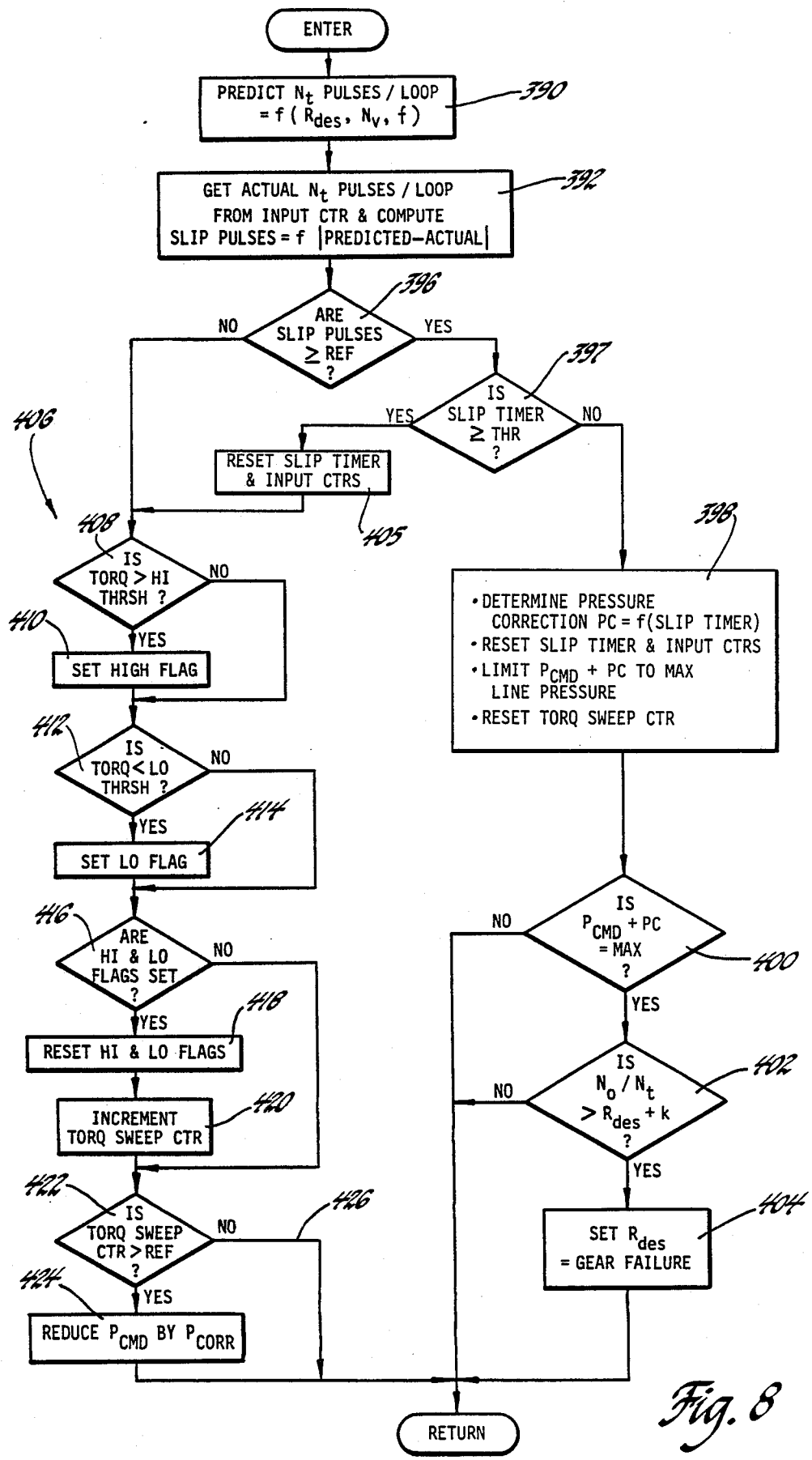

The flow diagrams depicted in FIGS. 5-8 represent program instructions to be executed by the microcomputer 302 of control unit 270 in mechanizing the clutch pressure detection/correction control functions of this invention. The flow diagram of FIG. 5 represents a main or executive program which calls various subroutines for executing particular control functions as necessary. The flow diagrams of FIGS. 6-8 represent the functions performed by those subroutines which are pertinent to the present invention.

Referring now more particularly to FIG. 5, the reference numeral 310 designates a set of program instructions executed at the initiation of each period of vehicle operation for initializing the various registers, timers, etc. used in carrying out the control functions of this invention. Following such initialization, the instruction blocks 312–318 are repeatedly executed in sequence as designated by the flow diagram lines connecting such instruction blocks and the return line 320.

Instruction block 312 serves to read and condition the various input signals applied to I/O device 300 via the lines 272-284, update (increment) the various control unit timers, and calculate various terms used in the control algorithms, such as the transmission input torque $T_i$. An algebraic expression for calculating the term $T_i$ is given above in reference to FIG. 4. Instruction block 314 determines the desired speed ratio, $R_{des}$.

This function involves both shift point generation and the pressure detection/correction functions of this invention and is depicted in greater detail by the flow diagrams of FIGS. 6-8, as indicated.

Instruction block 316 determines pressure commands for the pressure regulator valve PRV and the clutching devices 26-34 for both shifting and nonshift (steady state) modes of operation. During steady state operation, the various fluid operated valves 180-190 are maintained fully opened or fully closed, as the case may be, and the clutch pressure is scheduled via the PRV valve. Under such conditions, the PRV command is determined according to the sum of a normal steady state command $P_{CMD}$ and a pressure correction term PC. The normal steady state command $P_{CMD}$ is determined primarily as a function of the input torque indication $T_i$, and the pressure correction term P is determined as set forth in the flow diagram of FIG. 8 by the pressure detection/correction control of this invention.

Instruction block 318 converts the clutching device and PRV pressure commands to a PWM duty cycle based on the operating characteristics of the various actuators (empirically determined), and energizes the actuator coils accordingly.

As indicated above, the flow diagrams of FIGS. 6-8 depict shift point selection and the slippage detection/correction control of this invention in detail. The flow diagram of FIG. 6 refers primarily to shift point selection; the flow diagrams of FIGS. 7 and 8 represent subroutines called by the flow diagram of FIG. 6. The flow diagram of FIG. 7 details a shift progression routine for identifying gear or clutch failures during ratio shifting. The flow diagram of FIG. 8 details the slippage detection/correction control of this invention.

Referring now more particularly to the flow diagram of FIG. 6, it is first determined at decision block 330 if the engine 12 is running. If not, the remainder of the routine is skipped as indicated by the flow diagram line 332. If the engine is running, the decision block 334 is executed to determine if a speed ratio shift is in progress. If so, the block 336 is executed to monitor the progression of the shift. This routine is described in more detail in FIG. 6 as indicated and serves to identify a failure of the oncoming clutch or gear.

If no such failure is detected, the instruction blocks 337 and 340 are executed to restore the shift point table to its original calibration and to look-up the desired gear ratio $R_{des}$. The look-up of the desired ratio $R_{des}$ is a generally conventional routine and employs the use of a two-dimensional look-up table in which the transmission shift points are stored as a function of the throttle position (% T) and the transmission output speed ($N_o$). If a gear failure is indicated at decision block 338, the flow diagram portion designated generally by the reference numeral 342 is executed to alter the scheduled shift point lookup table as described below to reflect the unavailability of the failed ratio.

If a shift is not in progress, the block 344 is executed to carry out the steady state slippage detection/correction control of this invention. This control is depicted in greater detail in the flow diagram of FIG. 8 as indicated. If no gear failure is indicated by such routine, as determined at the decision block 346, the instruction blocks 347 and 340 are executed as described above to restore the shift point table to its original calibration and to look-up a desired gear ratio $R_{des}$ as a function of the throttle position % T and the transmission output speed $N_o$. If a gear failure is indicated, the flow diagram portion 342 is executed to adjust the scheduled shift point table to reflect the unavailability of the failed ratio.

Referring now to the flow diagram portion generally designated by reference numeral 342, the decision block 350 is first executed to retrieve the current shift pattern table from the memory of control unit 270. Assuming that the failed gear is designated as G, the instruction block 352 is then executed to create a shift point line from the next lower ratio (G−1) to the next higher ratio (G+1). If such ratios exist, a new shift point line is generated using the arithmetic average of the shift point lines involving the failed gear G. Then the instruction block 354 is executed to determine a maximum output speed limit corresponding to the maximum engine speed in the next lower gear ratio (G−1) and to limit the new shift point line so that the maximum engine speed is not exceeded.

If the torque converter clutch 26 is engaged, as determined at decision block 356, the instruction block 358 is then executed to limit the new shift point line so that the shift to the ratio (G+1) does not occur until the vehicle speed reaches the minimum engagement speed of the clutch 26 in the ratio (G+1). This minimizes the perceived busyness of transmission 14. If the torque converter clutch 26 is not engaged, the new shift point line is not limited, and the shift to the ratio (G+1) occurs with the clutch 26 disengaged. In such case, the execution of instruction block 358 is skipped, as indicated by the flow diagram line 360. Thereafter, the instruction block 362 is executed to replace the original shift point lines involving the failed ratio G with the new shift point line from the next lower ratio (G−1) to the next higher ratio (G+1). Thereafter, the instruction block 340 is executed as described above to look up the desired ratio $R_{des}$ now using the modified shift point schedule.

The above described shift point alteration routine (flow diagram portion 342) is but one way of altering the shift point table to eliminate a shift to the failed ratio. Other techniques, such as simply eliminating the shift point lines involving the failed ratio, are available. However, the illustrated routine minimizes the perceived transmission busyness and avoids abrupt changes in ratio and the discomfort and possible transmission damage associated therewith; it is the subject of a co-pending U.S. patent application Ser. No. 101,940 filed Sept. 28, 1987, and assigned to the assignee of the present invention.

Referring now more particularly to the shift progression routine flow diagram of FIG. 7, the instruction block 370 is first executed to compute the percentage of shift completion according to the expression:

$$\% \text{ completion} = [(R_{old} - (N_v/N_t)]/(R_o - R_{des})$$

where ($R_{old}$) designates the transmission speed ratio associated with the offgoing clutch. If the shift is substantially complete as determined by the decision block 372, the remainder of the routine is skipped as indicated by the flow diagram line 374. If not, the decision block 376 is executed to determine if the elapsed time of the shift (as monitored by a shift timer) is greater than or equal to a reference time corresponding to the time nominally required for the shift to progress to substantial completion. If the decision block 376 is answered in the negative, the remainder of the routine is skipped, as indicated by the flow diagram line 374. If the decision block 376 is answered in the affirmative, the shift is not progressing as it should, and the instruction block 378 is executed to decrease the offgoing clutch pressure to zero and to increase the oncoming clutch pressure to the maximum line pressure.

In a subsequent execution of the routine (as schematically indicated by the flow line break), the decision block 380 is executed to compare the actual transmission speed ratio ($N_t/N_o$) with a reference somewhat greater than the desired ratio $R_{des}$. If the actual ratio is greater than the reference, the instruction block 382 is executed to maintain the oncoming clutch at maximum line pressure for a predetermined time T.

In a further execution of the routine (as schematically indicated by the flow line break), the decision block 384 is executed to determine if the actual transmission speed ratio ($N_t$ $N_o$) is still greater than the reference ($R_{des}+K$). If so, the instruction block 386 is executed to flag the desired ratio $R_{des}$ as failed.

The flow diagram of FIG. 8 sets forth the steady state slippage detection/correction control of this invention in detail. Initially the instruction block 390 is executed to determine the number of turbine speed pulses that should be observed per execution loop of the routine. Such number is a straightforward function of the desired (engaged) speed ratio $R_{des}$, the transmission output speed $N_o$ and the loop execution frequency f. Then the instruction block 392 is executed to read the actual number of turbine speed pulses counted in the previous execution loop and to compute the absolute value of the difference between the predicted and actual number of pulses. As indicated above, the pulses are derived directly from the turbine and output speed transducers 288 and 290, and the pulses are accumulated in input counters internal to the I/O unit 300 of control unit 270. The absolute value of the difference between the predicted and actual number of pulses is referred to as the number of slip pulses and corresponds to the graph C of FIG. 2 as described above.

If the number of slip pulses is at least as great as the reference REF and the count in SLIP TIMER is less than the threshold THR (as determined by decision blocks 396 and 397), the slippage is considered unacceptable. In such event, the instruction block 398 is executed to reset the input counters and the SLIP TIMER and to update the pressure correction term PC. The pressure correction term is determined as a function of the count in the SLIP TIMER at the time of its reset, but is limited so that the sum of it and the steady state pressure command $P_{CMD}$ does not exceed the maximum transmission line pressure. In addition, the TORQ SWEEP CTR (defined below) is reset.

If the sum of the pressure correction PC and the steady state clutch pressure command $P_{CMD}$ has been increased to the maximum line pressure (as determined at decision block 400) and the actual speed ratio across the transmission $N_o/N_t$ exceeds the desired speed ratio $R_{des}$ by a reference K (as determined at decision block 402), the instruction block 404 is executed to indicate that the desired (engaged) ratio $R_{des}$ has failed.

If the number of slip pulses is at least as great as the reference REF and the count in the SLIP TIMER is at least as great as the threshold THR (as determined by decision blocks 396 and 397), the slippage is considered to be acceptable. In such event, the instruction block 405 is executed to reset the SLIP TIMER and the input counters, and the flow diagram portion, designated generally by the reference numeral 406, is executed to monitor the transmission input torque variable $T_i$ in relation to the upper and lower reference torque values $T_U$ and $T_L$ described above in reference to graph A of FIG. 4. The decision block 408 compares the input torque term $T_i$ with the upper torque reference $T_U$. If $T_i$ exceeds $T_U$, the instruction block 410 is executed to set the HIGH flag. The decision block 412 compares the term $T_i$ with the lower torque reference $T_L$. If $T_i$ is less than $T_L$, the instruction block 414 is executed to set the LOW flag.

If both the HIGH and LOW flags are set as determined at decision block 416, the transmission input torque has swept through the window defined by the upper and lower references TU and TL and the instruction blocks 418 and 420 are executed to reset the HIGH and LOW flags and to increment a counter referred to herein as the torque sweep counter. When the torque sweep counter exceeds a reference count REF, the decision block 424 is executed to reduce the pressure correction term PC by a predetermined correction amount $P_{CORR}$. When the torque sweep counter is less than or equal to the reference count REF, the execution of instruction block 424 is skipped as indicated by the flow diagram line 426.

If the number of slip pulses is less than the reference REF (as determined at decision block 396), the slippage is assumed to be acceptable and the flow diagram portion 406 is executed as described above to monitor the transmission input torque $T_i$ for determining if a reduction of the clutch pressure is appropriate.

The steady state slippage detection/correction control of tis invention operates as described above to increase the pressure supplied to the active clutch element in relation to a measure of the slippage when excessive clutch slippage is detected. The increase is mechanized with a pressure correction term PC, which is added to the normal steady state pressure command $P_{CMD}$. If the clutch pressure is increased to the maximum line pressure and the excessive slipping persists, a gear failure is indicated. In the absence of a gear failure, subsequent reductions in the pressure supplied to the active clutch are carried out only after the transmission input torque has swept through a predefined torque window a specified number of times without the detection of excessive slippage. In the illustrated embodiment, the specified number of torque sweeps—the reference count REF—is equal to 3. In this way, the pressure supplied to the active clutch experiences a relatively low frequency limit cycle in which the pressure is decreased to the point of slippage and then increased to eliminate slippage. As indicated above, this limits the slippage to within acceptable limits to avoid excessive heating and clutch element wear while enhancing the transmission operating efficiency by minimizing excessive clutch torque capacity.

While this invention has been described in reference to the illustrated embodiment, it will be understood that various modifications thereto will occur to those skilled in the art and that systems incorporating such modifications may fall in the scope of this invention which is defined by the appended claims.

The embodiments of the invention in which an exclusive property or privilege is claimed are defined as follows:

1. In a motor vehicle power transmission including a fluid operated transmission torque establishing device for transmitting torque between input and output shafts of the transmission, and a fluid pressure control mechanism for controlling the torque transmitting capacity of said torque establishing device in accordance with a pressure command, a method of operation for regulating the torque capacity of said torque establishing device during steady state operation of said transmission, comprising the steps of:

determining a pressure command for the fluid pressure control mechanism in accordance with a measure of the torque being transmitted through the torque establishing device;
  periodically generating a slip indication in relation to the cumulative amount of slippage of the torque establishing device;
  measuring the time required for the slip indication to exceed a predetermined reference, and when said reference is exceeded:
  increasing the commanded pressure in relation to the measured time if the measured time is less than a threshold defining a range of acceptable slippage, thereby to increase the torque transmitting capacity of said torque establishing device when the slippage thereacross is outside said acceptable range of slippage.

2. The method set forth in claim 1, including further steps operative when said slip indication exceeds said predetermined reference, and said measured time is at least as great as said threshold, such steps comprising:

comparing the measure of torque being transmitted through the torque establishing device in relation to a torque window defined by upper and lower torque thresholds to detect a sweeping of said measure of torque through said torque window; and
  reducing the commanded pressure by a predetermined correction amount when a predetermined number of successive torque sweeps have been detected without an intervening increase of the commanded pressure, thereby to minimize the torque transmitting capacity of said torque establishing device while maintaining the slippage thereacross within said acceptable range of slippage.

3. In a motor vehicle power transmission including a fluid operated transmission torque establishing device for transmitting torque between input and output shafts of the transmission, and a fluid pressure control mechanism for controlling the torque transmitting capacity of said torque establishing device in accordance with a pressure command, a method of operation for regulating the torque capacity of the torque establishing device during steady state operation of said transmission, comprising the steps of:

determining a pressure command for the fluid pressure control mechanism in accordance with a measure of the torque being transmitted through the torque establishing device;
  generating first and second electrical signals having pulse frequencies corresponding to the rotational speeds of said input and output shafts, and counting the number of generated pulses for each signal to form first and second cumulative pulse counts;
  computing a predicted cumulative pulse count according to the product of the transmission speed ratio which would occur with no slippage of the torque establishing device and one of said first and second cumulative pulse counts, and comparing said predicted cumulative pulse count with the other of said first and second cumulative pulse counts to provide a slip signal indicative of the cumulative slippage across said torque establishing device;
  measuring the time required for said slip signal to exceed a predetermined reference, and when said reference is exceeded:
  resetting said first and second cumulative pulse counts and increasing the pressure command in proportion to the measured time if the measured time is less than a threshold defining a range of acceptable slippage, thereby to increase the torque transmitting capacity of said torque establishing device when the slippage thereacross is outside said acceptable range of slippage.

4. In a motor vehicle power transmission including a fluid operated transmission torque establishing device for transmitting torque between input and output shafts of the transmission, and a fluid pressure control mechanism for controlling the torque transmitting capacity of said torque establishing device, a method of operation for regulating the torque transmitting capacity of the torque establishing device during steady state operation of said transmission, comprising the steps of:

determining a pressure command for the fluid pressure control mechanism according to the sum of a steady state pressure command $P_{CMD}$ based on a measure of the torque being transmitted through the torque establishing device and a pressure correction term PC;
  periodically generating a slip indication in relation to the cumulative amount of slippage of the torque establishing device;

measuring the time required for the slip indication to exceed a predetermined reference, and when said reference is exceeded:

updating the pressure correction term PC in relation to the measured time if the measured time is less than a threshold defining a range of acceptable slippage, such that the torque capacity of said torque establishing device is increased to reduce the slippage thereacross when such slippage is outside said acceptable range of slippage.

5. The method set forth in claim 4, including further steps operative when said slip indication exceeds said predetermined reference, and said measured time is at least as great as said threshold, such steps comprising:

comparing the measure of torque being transmitted through the torque establishing device in relation to a torque window defined by upper and lower torque thresholds to detect a sweeping of said measure of torque through said torque window; and reducing the pressure correction term PC by a predetermined correction amount when a predetermined number of successive torque sweeps have been detected without an intervening increase of the pressure correction term PC, thereby to minimize the torque capacity of said torque establishing device while maintaining the slippage thereacross within said acceptable range of slippage.

* * * * *